Figure 1:
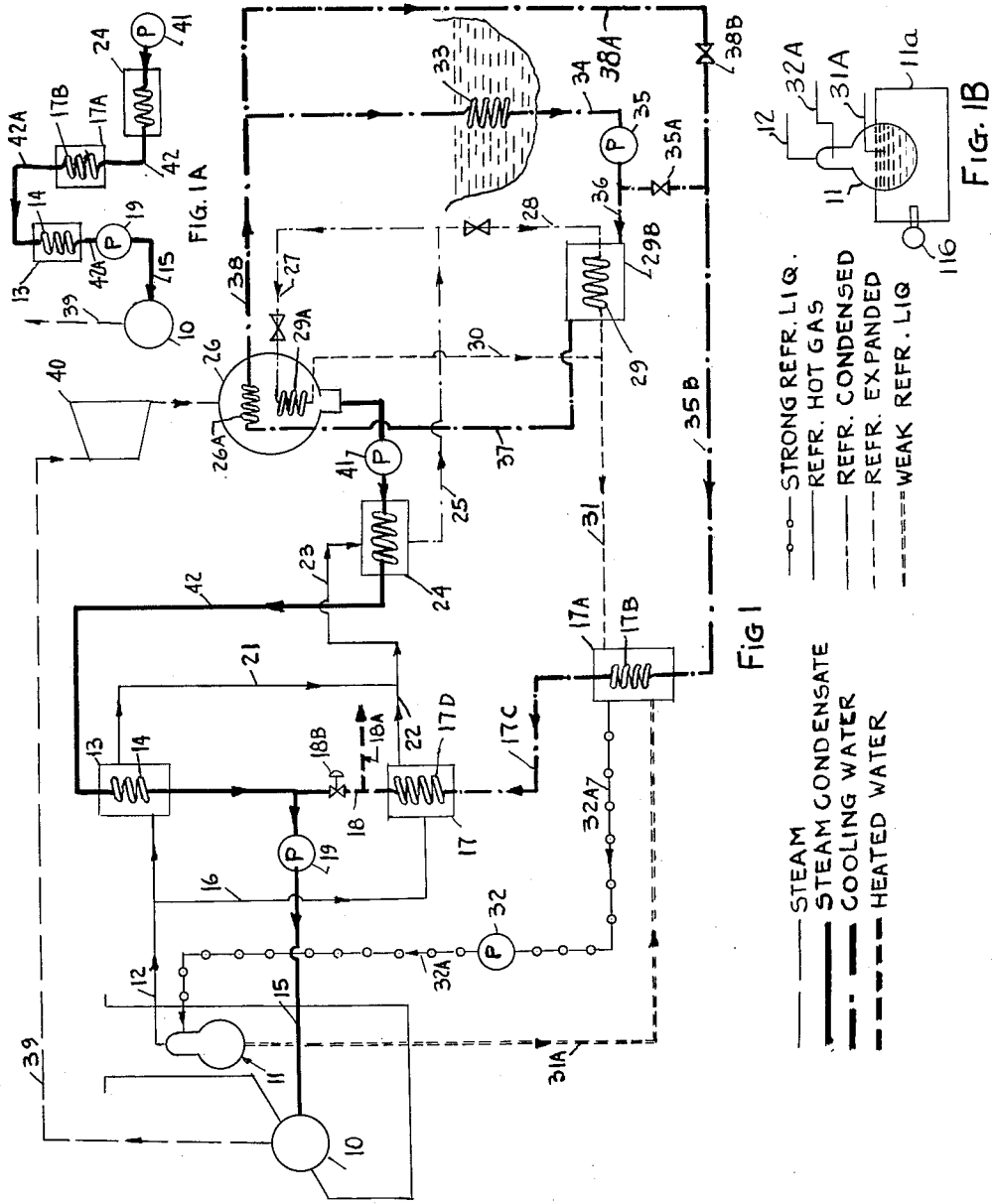

May 2, 1961  A. FURREBOE  2,982,864
IMPROVED HEAT CYCLE FOR POWER PLANTS
Filed May 21, 1956  3 Sheets-Sheet 1

ANTON FURREBOE
*INVENTOR.*
BY *M. Bjorndal*
*ATTY.*

May 2, 1961

A. FURREBOE 2,982,864

IMPROVED HEAT CYCLE FOR POWER PLANTS

Filed May 21, 1956

3 Sheets-Sheet 2

ANTON FURREBOE
INVENTOR.

BY M. Bjorndal
ATT'Y.

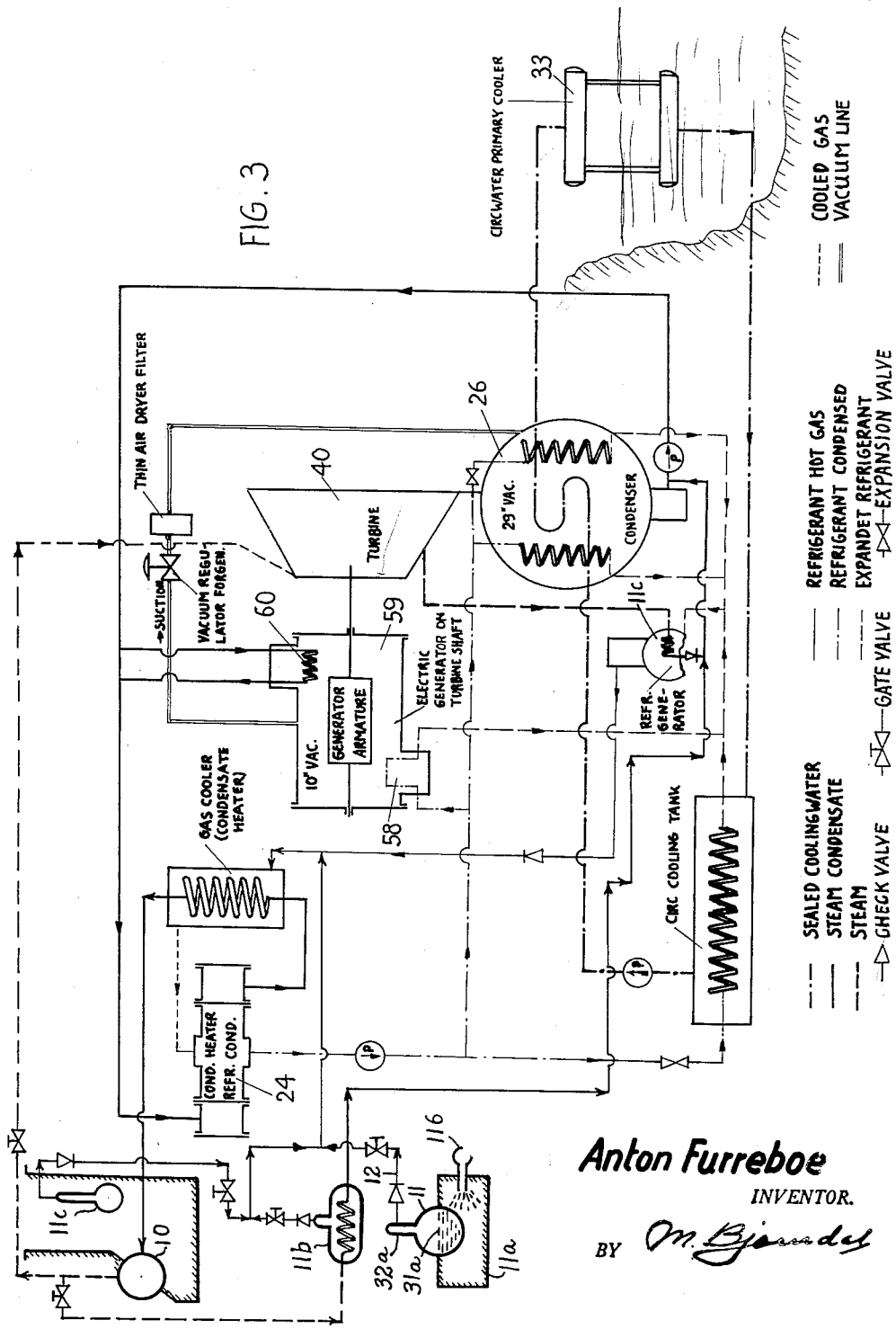

United States Patent Office 2,982,864
Patented May 2, 1961

2,982,864

IMPROVED HEAT CYCLE FOR POWER PLANTS

Anton Furreboe, 8220 10th Ave., Brooklyn, N.Y.

Filed May 21, 1956, Ser. No. 586,311

5 Claims. (Cl. 290—2)

This application is a continuation in part of my application filed August 11, 1950, Serial No. 178,796, now abandoned, relating to my invention of a system providing a method and means for generating refrigeration from waste heat in power plants and utilizing said refrigeration for the purpose of cooling in general, thereby reducing the quantities of cooling water required and insuring better control of cooling temperatures, as well as insuring maximum vacuum and full efficiency of power equipment at all times.

Present day power plants are usually located by the sea, by a lake or on a large river, due to the extremely large requirements for cooling water. Even when such suitable locations are found, the handling of the cooling water requires tremendous tunnels, screens, strainers, pumps, treatment of cooling water etc. Due to the precipitation and growth of settlement and slime on the surfaces, as well as on the tunnels, screens, etc., a periodic shutdown of the power plant for cleaning purposes is always required. This is an expensive procedure because reserve capacity must be provided to take care of the load and shutdown can only take place at a time when the load is at a minimum.

In many localities, expansion of power plants has taken place to a point where additional cooling water is only available at great expense. In addition, there are difficulties due to the fact that the cooling water varies considerably in temperature from summer to winter, which makes the requirements for cooling water greater in summer when the available volume is low. This often leads to a considerable reduction in cooling temperature, range, which again reduces the maximum obtainable vacuum in the main steam condenser. In many instances, it is only possible to obtain about 27–28 inches vacuum instead of the required 29 inches. It is well known to power engineers that the reduction of 1 inch in vacuum reduces the capacity of the power plant by approximately 5%. Thus a 100,000 kw. generator will only produce 90,000 kw. at 27 inches vacuum and 95,000 kw. at 28 inches vacuum. This means an overall loss of 5% to 10% in the efficiency of the power plant, which is both costly and undesirable.

To eliminate this loss of efficiency, and to eliminate difficulties in expense due to lack of sufficient volume of cooling water of the proper temperature, I have invented a new and novel system for utilizing some of the wasted heat of the boiler, for the production of refrigeration, for cooling of cooling water or direct cooling of other parts of the system. This refrigeration is generated by placing coils, containing the refrigerant, in the boiler at some suitable location such as in the hot flue gasses or in any other suitable location. In fact any type of waste heat can be utilized for this purpose providing it is of sufficiently high temperature and of sufficient capacity. The so called absorption system for refrigeration is utilized and the heated refrigerant from the waste heat coil is led to an expansion chamber where it is evaporatd and where the cooling takes place, as hereinafter described. As a matter of definition, it may be stated that the present invention introduces a system of using waste heat for the generation of refrigeration by the well known absorption system and utilizing this waste heat for the cooling of the condenser cooling water as well as for cooling generators, etc. It also uses refrigerant condensers where the refrigerant is liquified and where the heat developed thereby is utilized for heating the boiler feed water. Also, it introduces bleed steam where necessary for increased capacity and for better regulation. The remaining element of the power plant system are all well known and the novelty of the present invention resides in the method of applying this cooling in the power generating cycle thereby improving the overall efficiency of the system as hereinafter described.

The main object of my invention is to increase the efficiency of power plants by utilizing the waste heat or bleed steam or a furnace, oil or coal fired, for the generation of refrigeration, which may be used for the control of cooling temperatures and vacuum.

Another object of my invention is to reduce the cost of a power plant by eliminating the need for costly tunnels, screens, treatment plants, pumps, wiring etc. for the handling of the cooling water.

A further object of my invention is to provide an absorption type of refrigeration generated by waste heat from the hot flue gasses, which may be used to cool a sealed circuit of cooling water for the control of cooling temperatures and vacuum.

A further object of my invention is to provide means whereby the operating cost of the power plant can be reduced by eliminating costly shutdowns for the purpose of cleaning cooling water screens, tunnels, coils, precipitation tanks, etc.

Still another object of my invention is to provide a closed cooling system for power plants of high efficiency with accurate control of the cooling temperature and which does not require any shutdown for cleaning.

An ancillary object to the above is to provide a system where waste heat from a power plant is utilized for the purpose of generating refrigeration which may be used to advantage for providing refrigerated space, air conditioning or other cooling required for industrial or comfort purposes.

Other objects and advantages of my invention, will be apparent from the course of the following description.

In the accompanying drawings, forming a part of this specification, in which like numerals are used to designate like parts throughout the same, Figure 1 is a schematic flow sheet, illustrating a power plant system having waste heat generation of refrigeration and cooling embodying my invention.

Figure 1a represents a partial diagram illustrating a particular arrangement of my invention, Figure 1B represents a partial diagram of a species of my invention in which the refrigeration generator is operated as a separate boiler.

Figure 2:
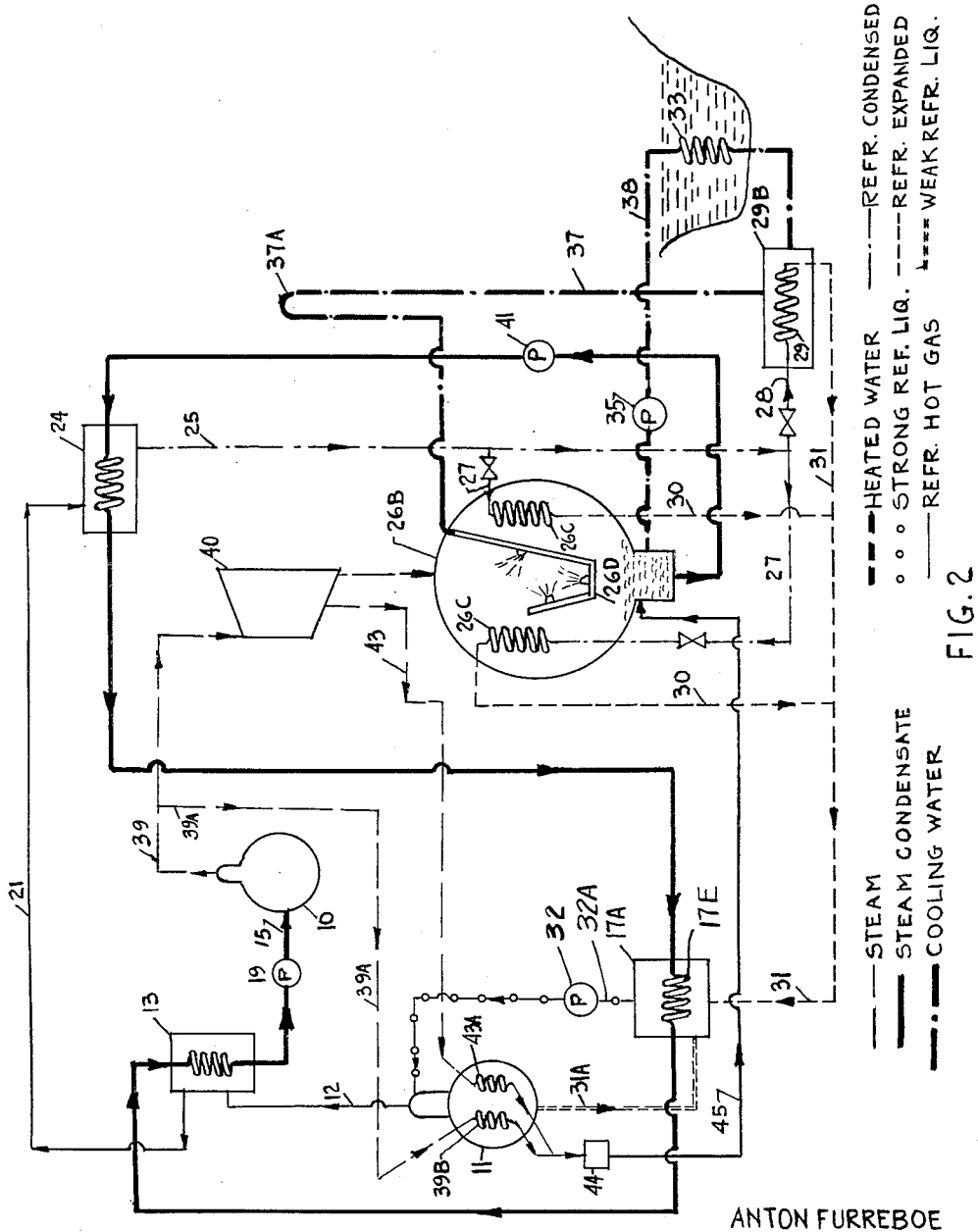

Figure 2 represents a schematic flow sheet of a power plant system having bleed steam generation of refrigeration and cooling embodying my invention, and, Figure 3 represents a schematic flow sheet of a power plant system having separately fired generation of refrigeration, bleed steam and live steam generation of refrigeration in addition to the waste heat process illustrated in Figure 1 as well as cooling of main generator by means of refrigerated air under low pressure instead of hydrogen.

In the drawings, wherein for the purpose of illustration is described a preferred embodiment of my invention, the numeral 10 designates the steam boiler, see Figure 1 in the fire box or flue of which is built in the refrigerant boiler or generator 11 from which the pipe 12 carries the hot refrigerant to the refrigerant cooler (feed water heater) 13. The heater 13 has a coil 14 through which the feed water coming from the steam condenser is preheated to a suitable temperature before being pumped to the steam boiler 10. The hot refrigerant also goes from pipe 12 into pipe 16 to the so called refrigerant cooler (water heater) 17. The feed water, make up and process water is heated here by the refrigerant and is led through pipe 18, pump 19 and pipe 15 to boiler 10, and through pipe 18a to process requirements in plant. After having given up a certain amount of heat in heaters 13 and 17, the still hot refrigerant is led through pipes 21, 22 and 23 to the refrigerant condenser (feed water heater), where an additional amount of heat is utilized in the heating of the feed water. The refrigerant condenser (feed water heater) is designated by numeral 24.

From the refrigerant condenser (feed water heater) 24, the condensed refrigerant proceeds under pressure to respectively the main condenser 26, and the sub-cooling circulating water tank 29B, through pipes 25, 27 and 28. In the heaters 13, 17 and 24, the refrigerant gave up its latent heat and was condensed and cooled so that when it is passing through coils 29 and 29A, it evaporates in the usual manner and will absorb heat from steam in main condenser 26 and cooling water in tank 29B respectively.

The refrigerant now in gaseous state continues through pipes 30 and 31 to an absorber (water heater) 17A which through pipe 31A is supplied with weak hot refrigerant liquor from the bottom of refrigerant boiler 11, and this liquor and the gas from pipes 30 and 31 mixes in the usual manner, resulting in the absorption of the gas by the weak liquor forming strong refrigerant liquor which after being cooled by water in coil 17B in absorber 17A is pumped in the usual manner by pump 32 through pipe 32A to refrigerant boiler 11, after which the refrigerating cycle is completed and continues in the same manner as it began.

During this absorption process, in absorber 17A heat is developed through the usual chemical reaction and this heat and some of the heat in said hot weak refrigerant liquor supplied from refrigerant boiler 11 as mentioned is transferred through coil 17B in absorber 17A to cooling water pumped from primary cooler 33 by pump 35, through valve 35A, and pipe 35B, through pipe 17C, coil 17D in refrigerant cooler 17 where it receives heat from hot refrigerant gas arriving through pipe 16 from refrigerant boiler 11. A part of the hot water in coil 17D is led through pipe 18 and regulating valve 18B to pump 19 through pipe 15 to steam boiler 10, while another part of said hot water is led through pipe 18A to other parts of the plant for use as process or sanitary hot water.

Depending on the heat balance requirements of the plant, water for cooling coil 17B in absorber 17A may be tapped from the slightly heated cooling water in pipe 38A from coil 26A in steam condenser 26 by closing valve 35A and opening valve 38B.

Also, depending on heat balance requirements of the plant, cooling water for coil 17B in absorber 17A (see Figure 1A) may be supplied from the steam cycle condensate in pipe 42, after having passed through refrigerant condenser (feed water heater) 24 by being led through pipe 42A to coil 14 in refrigerant cooler 13 and through pump 19 and pipe 15 to steam boiler 10 as shown in Fig. 1A.

The system illustrated in Figures 1 and 1A has a closed cooling water arrangement, which includes the circulating water primary cooler 33, from which the cooling water is led through pipe 34, to pump 35, through pipe 36 to sub-cooling circulating water tank 29B, through pipe 37, to steam condenser 26 (cooler 33 is installed and submerged in river lake or sea or locomotive tender), and returns through pipe 38, to the circulating water primary cooler 33, and or through valve 35A, pipe 35B to coil 17B in absorber 17A, through pipe 17C, coil 17D, pipe 18 to steam boiler 10, or through pipe 18A to plant for process water. Instead of placing refrigerant boiler 11 in flue of steam boiler 10, it may be an independent gas, oil or coal fired tube type boiler, as shown in Fig. 1B where 11a is the fire box and 11b is the burner.

The steam from boiler 10 goes through pipe 39 to the turbine 40, and from there to the condenser 26. The condensate from the condenser 26 is pumped by means of pump 41 to the refrigerant condenser (feed water heater) 24, through pipe 42, through heater 13 and back to steam boiler 10.

The operation of this system is as follows: The heated refrigerant coming from the refrigerant boiler 11 is cooled and condensed in the heaters 13, 17 and 24, and enters coils 29 and 29A as a cooled refrigerant, taking up heat from said coils and thereby cooling and reducing the temperature of the cooling water and the main condenser respectively. By means of pumps, valves and suitable instrumentation, the temperature of the cooling water and the temperature and degree of vacuum of the main condenser can thus be controlled inside of very narrow limits. It is obvious to one skilled in the art that this system can be utilized not only in large power plants, but also in ship installations, locomotives and smaller power plants, as well as in various types of industrial installations. It is well known that due to the temperature changes in the cooling water, ship power plants are sometimes unable to get water for more than 90–95% of their rated power output. This can be eliminated by the installation of my system and in addition, it is possible to provide ample refrigeration for space refrigeration, air conditioning and other cooling. The same holds for locomotives, where the taking on of cooling water is a difficult and expensive problem.

In Figure 2 is illustrated a system embodying my invention in which the refrigerant boiler 11 is heated by means of bleed steam through pipe 43 from turbine 40 or by steam direct from steam boiler 10 through pipe 39A and coils 43A and 39B placed in refrigerant boiler 11 and connected by trap 44 and pipe 45 for return of auxiliary steam condensate to main steam condenser.

The refrigeration cycle is identical to that shown in Figure 1 except that water heater 17 of Figure 1 has been omitted and at the main steam condensate from the condenser 26B, in addition to its path as shown in Fig. 1, goes through coil 17E in the refrigeration absorber 17A. In this way I have introduced a new step consisting of using the refrigerant absorber as a boiler feed water heater. Thus the main condensate receives the heat from the aforementioned hot refrigerant and the heat of absorption which would otherwise be taken up by the cooling water in pipe 35B, see Fig. 1. Two refrigerant coils, 26C, are shown in condenser 26B, Figure 2, instead of one 26A as shown in Figure 1. The refrigerant gas from coils 26C in Figure 2 returns through line 30 as in Figure 1 and follows the same path as in Figure 1 except as stated supra.

The condenser 26B in Figure 2 is a direct contact condenser where the cooling water from the same closed water cycle as illustrated in Figure 1 enters through pipe 37 as in Figure 1 through loop 37A interposed in said line 37 for protection of vacuum in condenser.

Instaed of said cooling water being led through coil 26A as in condenser 26 Figure 1, it is led through spray ring 26D with multiple nozzles spraying it in direct contact with bleed steam turbine 40. The cooling water is thus allowed to mix with steam affording better heat transfer and is collected together with steam condensate at bottom of condenser.

The cooling water pump 35 in Figure 2 is placed so that it gets direct suction from the hot well of the main steam condenser and forces the heated cooling water through primary cooler 33 sub-cooling circulating water tank 29B, back to spray ring 26D. This requires considerably less pumping power than that required in Figure 1 for circulating water cycle due to the vacuum in condenser.

The steam condensate from condenser 26B in Figure 2 follows the same path as in Figure 1 through pump 41, except that it goes through coil 17E in absorber 17A as mentioned above.

It enters steam boiler 10 through pipe 15 after having received heat from hot refrigerant gas in refrigerant condenser (feed water heater) 24, hot refrigerant liquor and chemical reaction in absorber 17A and from hot refrigerant gas in refrigerant cooler (feed water heater) 13 as in Figures 1 and 2.

In Figure 3 is illustrated another embodiment of my invention, in which I show how the main generator can be cooled effectively and the windage reduced by the use of air at about 10 inches of mercury vacuum. Some of the large generators are evacuated and filled with hydrogen, but this creates a hazard, as the hydrogen may escape or may cause explosions. In my system, I seal the generator in the usual method and evacuate the same partially down to approximately 10 inches of vacuum. I cool the air in the generator by means of coil 58, through which the refrigerant is passed. The electric generator 59 is furthermore cooled by coil 60, through which condensate is passed to the refrigerant condenser (feed water heater) 24. The coil 60 is placed in the generator for the purpose of picking up heat, for the condensate, from the generator air cooler. In this case, the condensate instead of sub-cooled water may be used together with refrigerating coils, in the most efficient parts of the air cooler, or sub-cooled condensate may be used. Figure 3 furthermore shows the application of both bleed steam and live steam to refrigeration generators 11c and 11b, respectively, and waste heat to refrigeration generator 11 as well as the separately fired power booster refrigeration generator 11a, all in one plant.

The operation of the system shown in Figure 3 is similar to that of Figure 2 except as described above. The main difference being found in the application of cooling refrigerant to the main generator through coil 58 and also in the use of air or a low pressure or partial vacuum for the cooling of the generator. The main cooling circuit is the same as described above for Figures 1 and 2. Instead of having a separate vacuum pump for the generator, one may connect the generator housing to the main condenser and utilize the condenser vacuum. This will greatly reduce the windage losses and thereby increase the efficiency of the generator.

In applying my system to a steam locomotive, I use a constant supply of water in the water tender and with this as basic cooling water, I apply the described refrigeration cycle generated by means of waste heat from the boiler, to condense steam either from turbine or from the reciprocating steam engine. In this manner, I eliminate the constant need of new water to be taken on either while in motion or at a station.

It is to be understood that the form and arrangement of my invention, herewith shown and described, is to be taken as a preferred example of the same, and that various changes in the shape, size and design can be made without departing from the spirit of my invention or the scope of the subjoined claims.

Having thus described my invention, I claim:

1. In a closed circuit power plant comprising in combination; a boiler, turbine and condenser; conduit means interconnecting the boiler, turbine and condenser in series; a feed water return conduit connecting the condenser and boiler; a cooling medium supplied to said condenser; heat exchangers disposed in said feed water return conduit; a waste heat fired refrigeration generator in heat exchange relation with the flue gases of said boiler; conduit means connecting the outlet of said refrigeration generator in series with said feed water heat exchanger and condenser, whereby the refrigerant flowing from said generator causes successive heating of the feed water and cooling of said condenser.

2. In a closed circuit power plant comprising in combination; a boiler, turbine and condenser; conduit means interconnecting the boiler, turbine and condenser in series; a feed water return conduit connecting the condenser and boiler; a cooling medium supplied to said condenser; heat exchangers disposed in said feed water return conduit; a refrigeration generator disposed in said conduit means between said boiler condenser and turbine, said generator being operated as required by bleed steam from said turbine and live steam from the boiler; conduit means connecting the outlet of said refrigeration generator in series with said feed water heat exchangers and condenser whereby the refrigerant flowing from said generator causes successive heating of the feed water and cooling of said condenser and condenser cooling medium.

3. In a closed circuit power plant comprising in combination; a boiler, turbine and condenser; conduit means interconnecting the boiler, turbine and condenser in series; a feed water return conduit connecting the condenser and boiler; a cooling medium circulated through said condenser; heat exchangers disposed in said feed water return conduit; a separately fired refrigeration generator disposed in said conduit means between said boiler and turbine; conduit means connecting the outlet of said refrigeration generator in series with said feed water heat exchangers and condenser whereby the refrigerant flowing from said generator causes successive heating of the feed water and cooling of said condenser and condenser cooling medium.

4. In a closed circuit power plant comprising in combination; a boiler, turbine, condenser and electric generator driven by said turbine, said generator having a plurality of cooling coils; conduit means interconnecting the boiler, turbine and condenser in operational relation, said conduit means including a feed water return conduit between said condenser and boiler; a cooling medium circulating through said condenser in a closed circuit cooling system; heat exchangers disposed in said feed water return conduit; a waste heat fired refrigeration generator in heat exchange relation with the flue gases of said boiler; a separately fired auxiliary, power booster, refrigeration generator; conduit means connecting the outlets of said refrigeration generators with said feed water heater, condenser and cooling coils of said electric generator, whereby the refrigerant flowing from said refrigeration generators causes successive heating of the feed water and cooling of said condenser, condenser cooling medium and cooling coils of said electric generator.

5. In a closed circuit power plant comprising in combination; a boiler, turbine, condenser and electric generator driven by said turbine, said generator being enclosed in a partial vacuum and having a plurality of cooling coils; conduit means interconnecting the boiler, turbine and condenser in operational relation said conduit means including a feed water return conduit between said condenser and boiler; a cooling medium circulating through said condenser; heat exchangers disposed in said feed water return conduit; a waste heat fired refrigeration generator in heat exchange relation with the flue gases of said boiler; a separately fired auxiliary, power booster, refrigeration generator; conduit means supplying bleed steam from said turbine and live steam from said boiler to said auxiliary refrigeration generator, and other conduit means connecting the outlets of both of said refrigeration generators with said feed water heat exchangers, condenser and cooling coils of said electric generator, whereby the refrigerant flowing from said refrigeration generators causes successive heating of the feed water and cooling of said condenser, condenser cooling medium and electric generator.

References Cited in the file of this patent
UNITED STATES PATENTS

| 1,750,035 | Brown | Mar. 11, 1930 |
| 1,782,220 | Wanamaker et al. | Nov. 18, 1930 |
| 2,120,909 | Schmer | June 14, 1938 |

FOREIGN PATENTS

| 104,175 | Switzerland | Apr. 1, 1924 |